United States Patent

Ruyle et al.

[15] 3,674,870

[45] July 4, 1972

[54] PHENYL BENZOIC ACID COMPOUNDS IN COMPOSITIONS AND METHODS FOR TREATING INFLAMMATION

[72] Inventors: William V. Ruyle, Scotch Plains; Lewis H. Sarett, Skillman; Alexander R. Matzuk, Colonia, all of N.J.

[73] Assignee: Merck & Co. Inc., Rahway, N.J.

[22] Filed: June 9, 1970

[21] Appl. No.: 44,868

Related U.S. Application Data

[63] Continuation-in-part of Ser. No. 699,022, Jan. 19, 1968, abandoned, which is a continuation-in-part of Ser. No. 577,819, Sept. 8, 1966, abandoned, which is a continuation-in-part of Ser. No. 420,823, Dec. 23, 1964, abandoned.

[52] U.S. Cl............................424/230, 424/308, 424/311, 424/315, 424/317, 424/324
[51] Int. Cl...........................................................A61v 27/00
[58] Field of Search ...............................424/317, 230, 311

[56] References Cited

UNITED STATES PATENTS 2,744,916   5/1956   Sahyum et al. ........................424/317

*Primary Examiner*—Stanley J. Friedman
*Attorney*—Michael C. Sudol, Jr., H. E. Westlake, Jr. and I. Louis Wolk

[57] ABSTRACT

The invention relates to a method of treating inflammation by administering substituted 5-(phenyl) benzoic acids, esters and non-toxic pharmaceutically accepted salts thereof to patients.

22 Claims, No Drawings

PHENYL BENZOIC ACID COMPOUNDS IN COMPOSITIONS AND METHODS FOR TREATING INFLAMMATION

CROSS REFERENCES TO RELATED APPLICATIONS

This application is a continuation-in-part of co-pending application U. S. Ser. No. 699,022 filed Jan. 19, 1968, now abandoned, which latter case is a continuation-in-part of U. S. Ser. No. 577,819 filed Sept. 8, 1966, now abandoned, which latter case is itself a continuation-in-part of application U. S. Ser. No. 420,823 filed Dec. 23, 1964, now abandoned.

BACKGROUND OF THE INVENTION

1. Field of Invention

Generally, this invention relates to substituted 5-(phenyl) benzoic acids, esters and non-toxic pharmaceutically acceptable salts thereof for use in the treatment of inflammatory type diseases. It is an object of this invention to prepare compounds having anti-inflammatory properties but not having many of the side effects which are generally associated with steroid type anti-inflammatory agents. Prior to this time, steroid type anti-inflammatory agents such as CORTONE, HYDROCORTONE and DECADRON were commonly used to relieve inflammation but as stated, these compounds exhibit many undesirable side effects.

2. Description of the Prior Art

The closest prior art compounds which could be found are those shown and described in U. S. Pat. Nos. 2,744,916 and 3,123,543. Neither of these patents disclose an anti-inflammatory use for the compounds. These references disclose 2-hydroxy-5-phenyl benzoic acid (5-phenyl salicylic acid) and various ester and amide derivatives thereof. Also the prior art discloses acetyl salicylic acid (aspirin). The compounds of the instant invention, however, are more potent than the prior art compounds at lower dosages and exhibit fewer side effects than the prior art compounds. The prior art compounds disclosed in the two patent references are not substituted with halo or halo groups on the phenyl moiety attached to the 5-position of the benzoic acid.

SUMMARY OF THE INVENTION AND DESCRIPTION OF THE PREFERRED EMBODIMENTS

This invention relates to new biphenyl compounds, and to a method of treating inflammation using these compounds and to processes for producing the same. More specifically, this invention relates to substituted 5-(phenyl)benzoic acids, esters, amides, anhydrides and non-toxic pharmaceutically acceptable salts thereof. Still more specifically, this invention relates to compounds having the general formula:

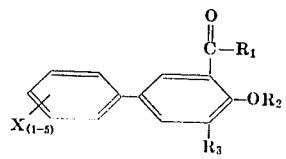

wherein $X_{(1-5)}$ is halo, such as fluoro or chloro but especially fluoro; X being on one or more of the phenyl carbon atoms;

$R_1$ is selected from the group consisting of hydroxy, phenoxy, diloweralkylamino, (such as, dimethylamine), diloweralkylamino loweralkoxy (such as diethylaminoethoxy);

$R_2$ is selected from the group consisting of hydrogen and lower alkanoyl (such as acetyl, propionyl and butyryl);

$R_3$ is selected from the group consisting of hydrogen and methyl.

Also included in the compounds of this invention are the pharmaceutically non-toxic salts of the acids of the compounds of Formula I such as the ammonium, alkali metal (such as sodium or potassium); alkaline earth metals (such as calcium, barium or magnesium); amine; aluminum; iron; choline; glucosamine; S-methyl methonine salts, piperazine, diloweralkylamino lower alkanol, chloroquine and hydroxy chloroquine; the anhydride of said acids, the mixed anhydrides of said acids and 2-acetoxy benzoic acid.

In the especially preferred aspects of this invention, $R_1$ is hydroxy, $R_2$ is hydrogen or acetyl, $R_3$ is hydrogen and X is fluoro;

X being on any position of the phenyl moiety when X is one fluoro group but particularly on the 4'-position and on any one or combination of the other positions of the phenyl moiety when X represents 2-5 fluoro groups.

Representative compounds of this invention are as follows:

2-hydroxy-5-(4'-fluorophenyl)benzoic acid;
2-acetoxy-5-(4'-fluorophenyl)benzoic acid;
2-hydroxy-5-(2'fluorophenyl)benzoic acid;
2-hydroxy-5-(2',4'-difluorophenyl)benzoic acid;
2-hydroxy-5-(3'-fluorophenyl)benzoic acid;
2-hydroxy-5-pentafluorophenyl benzoic acid;
2-hydroxy-3-methyl-5-(4'-fluorophenyl)benzoic acid;
2-hydroxy-5-(4'-chlorophenyl)benzoic acid;
N,N-dimethyl-5-(4'-fluorophenyl)salicylamide;
β-diethylaminoethyl-5-(4'-fluorophenyl)salicylate;
phenyl-5-(4'-fluorophenyl)salicylate;
aluminum-2-acetoxy-5-(4'-fluorophenyl)-benzoate salt;
aluminum-2-hydroxy-5-(4'-fluorophenyl)-benzoate salt;
choline-2-acetoxy-5-(4'-fluorophenyl)-benzoate salt;
choline-2-hydroxy-5-(4'-fluorophenyl)-benzoate salt;
sodium-2-acetoxy-5-(4'-fluorophenyl)-benzoate salt;
sodium-2-hydroxy-5-(4'-fluorophenyl)-benzoate salt;
2-hydroxy-5-(pentafluorophenyl)-benzoic acid;
2-acetoxy-5-(pentafluorophenyl)-benzoic acid;
β-diethylaminoethyl-2-hydroxy-5-(4'-fluorophenyl)-benzoate;
β-diethylaminoethyl-2-acetoxy-5-(4'-fluorophenyl)-benzoate.

This invention also relates to a method of treating inflammation in patients using a compound of Formula I, particularly an especially preferred compound as the active constituent.

We have found that the compounds of Formula I have anti-inflammatory activity and are effective in the prevention and inhibition of edema and granuloma tissue formation as shown by reduction of edema in the rat's foot induced by the injection of an inflammatory (phlogistic) agent into the rat's foot.

The compounds of the instant invention can be used to treat inflammation by reducing inflammation and relieving pain in such diseases as rheumatoid arthritis, osteoarthritis, gout, infectious arthritis and rheumatic fever. Furthermore, the compounds of the instant invention have better potency at the same dosage levels than similar type compounds known in the prior art and exhibit a lower incidence of side effects.

The compounds of Formula I also have anti-pyretic and analgesic activity and would be administered and used in the same manner and in the same dosage ranges as if they were being used to treat inflammation as discussed further on.

The especially preferred compounds of the instant invention exhibit in addition to potent anti-inflammatory effects a smaller incidence of vomiting (emesis effect) than do similar type compounds of the prior art, especially acetyl salicylic acid (aspirin) type compounds. The especially preferred compounds of the instant invention all have a better therapeutic ratio than does aspirin.

The treatment of inflammation in accordance with the method of the present invention is accomplished by orally administering to patients a composition of a compound of Formula I, particularly the especially preferred compounds in a non-toxic pharmaceutically acceptable carrier, preferably in tablet or capsule form.

The non-toxic pharmaceutical carrier may be for example, either a solid or a liquid. Exemplary of solid carriers are lactose, corn starch, gelatin, talc, sterotix, stearic acid, magnesium stearate, terra alba, sucrose, agar, pectin, cab-o-sil, and acacia. Exemplary of liquid carriers are peanut oil, olive oil, sesame oil and water. Similarly, the carrier or diluent may include a time delay material such as glyceryl monostearate or glyceryl distearate alone or with a wax.

Several pharmaceutical forms of the therapeutically useful compositions can be used. For example, if a solid carrier is used, the compositions may take the form of tablets, capsules, powders, troches or lozenges, prepared by standard pharmaceutical techniques. If a liquid carrier is used, the preparation may be in the form of a soft gelatin capsule, a syrup or a liquid supsension.

The active compounds of Formula I and of the compositions of this invention are present in an amount sufficient to treat inflammation, that is to reduce inflammation. Advantageously, the composition will contain the active ingredient, namely, the compounds of Formula I in an amount of from about 1 mg. to 140 mg. per kg. body weight per day (50 mg. to 10 g. per patient per day), preferably from about 2 mg. to 70 mg. per kg. body weight per day (100 mg. to 5 g. per patient per day).

The method of treatment of this invention comprises internally administering to a patient (animal or human), a compound of Formula I, particularly an especially preferred compound admixed with a non-toxic pharmaceutical carrier such as exemplified above. The compounds of Formula I and particularly the especially preferred compounds will be present in an amount of from 1 mg. to 140 mg./kg. body weight per day, preferably from about 2 mg. to about 70 mg. per kilogram body weight per day and especially from 4 mg. to 10 mg./kg. body weight per day. The most rapid and effective anti-inflammatory effect is obtained from oral administration of a daily dosage of from about 4 to 10 mg./kg./day. It should be understood, however, that although preferred dosage ranges are given, the dose level for any particular patient depends upon the activity of the specific compound employed. Also many other factors that modify the actions of drugs will be taken into account by those skilled in the art in the therapeutic use of medicinal agents, particularly those of Formula I, for example, age, body weight, sex, time of administration, route of administration, rate of excretion, drug combination, reaction sensitivities and severity of the particular disease.

The test method by which anti-inflammatory activity is determined is by the ability of the compounds of Formula I to inhibit the edema induced by injection of an inflammatory (phlogistic) agent into the tissue of the foot of the rat. Groups of six male rats (Sprague Dawley strain, 150 ± 15 g.) each are given orally the compounds to be tested one hour before 0.1 ml. of 1 percent suspension of carragenin is injected into the plantar surface of the right hind paw. Immediately and again three hours later, the foot volume is measured by its displacement of mercury and recorded automatically. The difference between the immersion and final volumes is a measurement of the edema produced. The compounds tested were suspended or dissolved in 0.5 percent methocel whereas controls received only the methocel. A usual test of 30 mg./kg. and one repetition plus one dose of 90 mg./kg. were usually given.

The above test method is known to correlate with anti-inflammatory activity in humans and is a standard test used to determine anti-inflammatory activity. This correlation is shown by compounds known to be clinically active, including, INDOCIN, ASPIRIN, BUTAZOLIDIN, TANDEARIL, CORTONE, HYDROCORTONE and DECADRON. The test results for the compounds shown in Formula I above are compared with similar tests run on the closest of the prior art compounds which applicants could determine, namely, 5-phenyl salicylic acid and the corresponding derivatives thereof disclosed in Sayhun et al., U. S. Pat. No. 2,744,916 and 3,123,543 and acetyl salicylic acid (aspirin). The results of these tests are as follows:

| Applicants Compounds | Dose mg/kg | Edema % Inhibition | |
|---|---|---|---|
| 2-hydroxy-5-(4'-fluorophenyl) benzoic acid | 3.33 | 18 | |
| | 10 | 47 | |
| | 30 | 73 | |
| | 90 | 77 | |
| 2-acetoxy-5-(4'-fluorophenyl) benzoic acid | 3.33 | 25 | |
| | 10 | 37 | Average |
| | 10 | 55 | of |
| | 90 | 70 | 5 tests |
| 2-hydroxy-5-(2'-fluoropheny benzoic acid | 10 | 33 | |
| | 30 | 56 | |
| | 90 | 69 | |
| 2-hydroxy-5-(2',4'-difluorophenyl)benzoic acid | 3.33 | 24 | |
| | 10 | 51 | Average |
| | 30 | 66 | of |
| | 90 | 77 | 2 tests |
| 2-hydroxy-5-(3'-fluorophenyl) benzoic acid | 10 | 28 | |
| | 30 | 52 | |
| 2-hydroxy-5-pentafluorophenyl benzoic acid | 10 | 47 | |
| | 30 | 56 | |
| | 90 | 68 | |
| 2-hydroxy-3-methyl-5-(4'-fluorophenyl)benzoic acid | 30 | 41 | |
| 2-hydroxy-5-(4'-chlorophenyl) benzoic acid | 10 | 13 | Average |
| | 30 | 27 | of 2 |
| | 100 | 52 | tests |
| N,N-dimethyl-2-hydroxy-5-(4'-fluorophenyl)benzamide | 30 | 23 | |
| β-diethylaminoethyl-2-hydroxy-5-(4'-fluorophenyl)benzoate | 10 | 19 | |
| | 30 | 35 | |
| phenyl-2-hydroxy-5-(4'-fluorophenyl)benzoate | 10 | 29 | |
| | 30 | 54 | |

| Prior Art Compounds | Dose mg/kg | Edema % Inhibition | |
|---|---|---|---|
| 5-phenyl salicylic acid or 2-hydroxy-5-(phenyl benzoic acid | 50 | 42 | Average |
| | 100 | 51 | of tests |
| | 3.33 | — | |
| | 10 | 9 | |
| | 30 | 21 | |
| | 90 | 79 | |
| N,N-dimethyl-5-phenyl salicylamide | 50 | 7 | Average |
| | 100 | 17 | of 3 tests |
| | 200 | 27 | |
| phenyl-5-phenyl salicylate | 50 | 11 | Average |
| | 100 | 26 | of 2 tests |
| β-diethylaminoethyl-5-phenyl salicylate HCl | 50 | 7 | Average |
| | 100 | 29 | of 2 tests |
| acetyl salicylic acid (aspirin) (2-acetoxy-benzoic acid) | 3.33 | 16 | Avg. 2 tests |
| | 30 | 21 | Avg. 5 tests |
| | 90 | 39 | Avg. 4 tests |
| | 180 | 60 | Avg. 3 tests |
| | 270 | 74 | Avg. 3 tests |

In each instance above, the activity of the compounds shown in Formula I was greatly enchanced by the presence of a halo group, particularly the fluoro group in the prime phenyl moiety of the compound. In one pair, namely 2-hydroxy-5-phenyl salicylic acid (2-hydroxy-5-phenyl benzoic acid) and 2-hydroxy-5-(4'-fluorophenyl) benzoic acid, a statistical analysis was made on the data on edema volume obtained as previously shown. It was determined that 2-hydroxy-5-(4'-fluorophenyl)benzoic acid is 4.15 times as potent as 2-hydroxy-5-phenyl benzoic acid of the prior art. Statistical data showed that if this test were repeated, the compound, 2-hydroxy-5-(4'-fluorophenyl)benzoic acid, of Formula I would be at least 3.11 times as potent in reducing inflammation as the 2-hydroxy-5-phenyl benzoic acid of the prior art, but not 5.62 times as potent. Also in the above comparisons and from the above data, 2-hydroxy-5-phenyl benzoic acid when given at a dose of 90 mg./kg. approximately matches the effect of 2-hydroxy-5-(4'-fluorophenyl)benzoic acid at less than one-third the does. In other words, the addition of fluorine at least tripled the potency in this particular compound. Generally, it can be seen that the compounds of the instant invention are more potent at lower dosage ranges than compounds of the prior art.

In addition to the above tests, the potency of three of applicants' compounds relative to the best prior art compound, namely, 5-phenyl salicylic acid, was estimated recently in the rat foot-edema test as part of a multiple assay. Three graded doses of each preparation were administered orally to individual groups of six rats. All rats were given an intraplantar injection of carrageenan (0.1 ml. of a 1 percent suspension in the right hind paw) approximately 1 hour after receivinG the test preparations. Three hours later, the volume of the edematous foot was measured using a mercury displacement technique. This test method is similar to the one previously described.

The assay was replicated four times since one of the experimental objectives was to study day to day variability among relative potency estimates. For 2-acetoxy-5-(4'-fluorophenyl)benzoic acid, the four estimates of relative potency varied from 4.97 to 8.13, a ratio of 1.6 for highest to lowest. 2-hydroxy-5-(4'-fluorophenyl)benzoic acid varied from 5.20 to 8.56, a ratio of 1.6, as for 2-acetoxy-5-(4'-fluorophenyl)benzoic acid. However, these did not differ significantly from a ratio of 1.0, indicating that the estimates were homogeneous within the limits of experimental error. On the other hand, 2-hydroxy-5-pentafluorophenyl benzoic acid varied from 3.05 to 7.25, a ratio of 2.4. This indicated significant heterogeneity among the estimates at $P<0.05$.

Table I below shows average foot volume for each of the preparations. The estimates of relative potency and 95 percent confidence limits (estimated using Dunnett's $t$) are summarized in Table II, also included below. The combined estimate of relative (i.e., replications 1–4) is also shown in this table. All replicates showed valid results (i.e., linearity and parallelism) except replicate 4, which showed a lack of parallelism at $P<0.05$. However, since this was not observed in any of the other replicates, the apparent lack of parallelism was ignored and "average" relative potencies calculated. Since "$g$" was small (varying from 0.035 to 0.067), the data were combined using the weighted procedure suggested by Bliss (Vitamin Methods II, Academic Press Inc., Publishers, New York, 1951, pp. 576–582). The replicate variance was added to the intrinsic variance of the assays for 2-hydroxy-5-pentafluorophenyl benzoic acid. ("$g$" is defined in Finney, D. J. Statistical Method in Biological Assay. p. 17, 28, 34, 114 and other pages. Hafar Publ. Co., New York, 2nd Ed., 1964.)

TABLE I – AVERAGE FOOT VOLUMES

| Preparation | Dose | Volume (ml. of mercury displaced) Replicate— | | | |
|---|---|---|---|---|---|
| | | 1 | 2 | 3 | 4 |
| 2-hydroxy-5-(phenyl)benzoic acid | 10 | .55 | .74 | .60 | .68 |
| | 30 | .41 | .54 | .56 | .58 |
| | 90 | .24 | .36 | .29 | .26 |
| 2-acetoxy-5-(4'-fluorophenyl) benzoic acid. | 3.3 | .48 | .65 | .52 | .53 |
| | 10 | .36 | .47 | .44 | .36 |
| | 30 | .18 | .25 | .28 | .20 |
| 2-hydroxy-5-(4'fluorophenyl)benzoic acid. | 3.3 | .43 | .61 | .48 | .56 |
| | 10 | .39 | .40 | .38 | .43 |
| | 30 | .18 | .27 | .22 | .25 |
| 2-hydroxy-5-pentafluorophenyl benzoic acid. | 3.3 | .38 | .76 | .50 | .58 |
| | 10 | .34 | .50 | .36 | .44 |
| | 30 | .21 | .37 | .29 | .38 |

TABLE II

| | | | | | |
|---|---|---|---|---|---|
| 2-acetoxy-5-(4'-fluorophenyl)benzoic acid | 4.97–(2.54–9.70) | 5.10–(3.14–8.30) | 5.54–(3.08–9.91) | 8.13–(4.52–14.66) | 5.78–(4.52–7.38) |
| 2-hydroxy-5-(4'-fluorophenyl)benzoic acid | 5.20–(2.66–10.02) | 5.96–(3.64–9.75) | 8.56–(4.63–15.85) | 5.81–(3.30–10.23) | 6.25–(4.88–8.00) |
| 2-hydroxy-5-pentafluorophenyl benzoic acid | 6.23–(3.14–12.36) | 3.05. (1.90–4.90) | 7.25–(3.97–13.23) | 3.98–(2.29–6.90) | 4.71–(2.49–8.89) |

Potency and 95% confidence limits of 2-acetoxy-5-(4'-fluorophenyl) benzoic acid, 2-hydroxy-5-(4'-fluorophenyl)benzoic acid, and 2-hydroxy-5-pentafluorophenyl benzoic acid: relative to 2-hydroxy-5-(phenyl)benzoic acid.

The compounds of this invention may be prepared either from a biphenyl phenol or from the following type starting material:

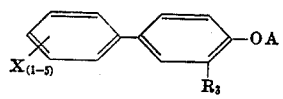

wherein:
A is an alkali metal ion; and
X and $R_3$ are as previously defined.

Some of these compounds are prepared from the individual phenyl moieties of the above starting material by the well-known Gomberg reaction. Others, where the biphenyl moiety is known, require the appropriate reactions to obtain the functional group, if needed, as well as the metal salts. However, all of the compounds may be obtained by first preparing an aniline compound containing an X followed by a Gomberg reaction with nitrobenzene or anisole or an $R_3$ (methyl) substituted nitrobenzene or anisole, subsequently reacting either the nitro group or the methoxy group (from nitrobenzene or anisole) of the biphenyl compound thus prepared so as to obtain the alkali salt starting material. For example, 2-fluoro-5-nitroaniline may be diazotized to the corresponding 2-fluoro-5-nitrophenol and said nitrophenol reduced to obtain the appropriate aniline compound needed for the Gomberg reaction. (When as in this cited example, the benzene compound contains an alkoxy group the Gomberg reaction is carried out with nitrobenzene). The nitrobiphenyl compound thus obtained may be readily reduced to the amino compound and subsequently diazotized to the corresponding hydroxy compound. Alternatively, when the aniline compound used in the Gomberg reaction does not have an alkoxy substituent on it, it may be reacted with an alkoxy benzene rather than nitrobenzene. Using this procedure, the alkoxy biphenyl compound obtained after the Gomberg reaction may, by one step, be converted to the corresponding hydroxy-biphenyl compound, for example by reaction with hydriodic acid.

Although the above reaction sequence can be used when $R_3$ is methyl, it is preferred to carry out the following reaction sequence when $R_3$ is methyl. For example, the methyl-2-hydroxy-5-(4'-fluorophenyl)-benzoate ester compound is reduced to the corresponding alcohol. This alcohol compound is then acylated, whereupon it is subsequently hydrogenated to the corresponding 4-(4'-fluorophenyl)-2-methylphenyl acetate. This compound is then saponified or hydrolyzed to the corresponding phenol compound, which in turn is carbonated to form the 5-(4'-fluorophenyl)-2-hydroxy-3-methyl benzoic acid.

In the Gomberg reaction mentioned above, a mixture of isomers of the biphenyl compound is obtained; therefore, in order to obtain the desired 4-(substituted phenyl)-benzene compound in a pure form a chromatographic separation is required.

The 4-(substituted phenyl)-phenol compounds obtained as described above may then be converted to the corresponding alkali salt by any well-known means, for example, reaction with an appropriate alkali metal in an inert solvent.

The acid compounds of this invention may be prepared from the previously prepared alkali phenolate or phenol compound. The preparation of these acid compounds are carried out by using the well-known Kolbe-Schmidt carbonation procedure. In this carbonation step, the phenolate is reacted with carbon dioxide or the phenol is reacted with carbon dioxide in the presence of an alkali carbonate. The process may be shown as follows:

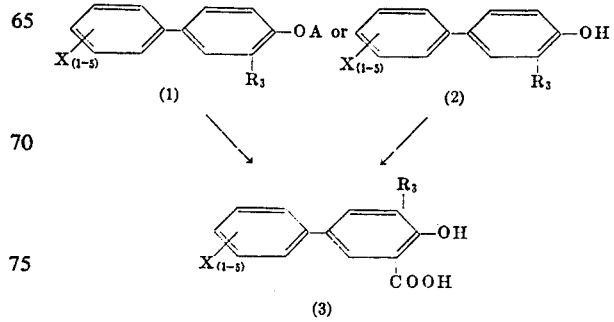

Equivalents:
  As previously indicated.
  Reactions and Conditions
  Step 1.
    Reaction with carbon dioxide at elevated temperatures (above 75° C. preferably above 100° C.) with or without a solvent preferably without a solvent (or if the solvent is used, any high-boiling inert solvent may be used) until the reaction is substantially complete; and subsequent acidification of the reaction mixture.
  Step 2.
    Reaction with carbon dioxide in the presence of an alkali carbonate, such as potassium, sodium, and the like, especially potassium, at elevated temperatures (above 75° C. preferably above 100° C.) with or without a solvent preferably without a solvent (or if the solvent is used, any high boiling inert solvent may be used) until the reaction is substantially complete; and subsequent acidification of the reaction mixture.

Reaction Steps (1) and (2) are the well-known Kolbe-Schmidt reaction. Since the reaction conditions are not critical, this invention contemplates not only the particular procedure shown but all other variations of this carbonation step which are well-known in the art.

The compounds of this invention, wherein $R_1$ is a group such that an ester is the final compound, (i.e., $R_1$ = phenoxy or diethylaminoethoxy), may be prepared by any esterification procedure, using an esterifying agent containing the appropriate $R_1$ group. For example, the benzoic acid compound of this invention may be reacted with the appropriate hydroxylic compound at elevated temperatures in the presence of a strong acid to form the desired $R_1$ compound. In the case of compounds where $R_1$ is phenyl, a mixture of the acid, phenol and phosphorous oxychloride is heated to produce the desired product. In the case wherein $R_1$ is diethylaminoethoxy, the potassium salt of the acid is reacted with diethylaminoethylchloride to produce the desired ester.

The compounds of this invention, wherein $R_1$ is a group such that an amide is the final compound (i.e., $R_1$ is dimethylamino), may be prepared by any suitable amidation reaction. For example, the benzoic acid compound (preferably the methyl or ethyl ester) may be reacted with an amine compound, at any suitable temperature (room temperature to reflux).

The final compound, wherein $R_2$ is lower alkanoyl (preferably acetyl), may be prepared by any suitable alkanoylation reaction. For example, the corresponding hydroxy benzoic acid, ester, or amide (preferably the ester) may be reacted with a lower alkanoic acid anhydride (preferably acetic anhydride) in the presence of a catalyst such as sulfuric acid, pyridine, p-toluenesulfonic acid, and the like (preferably pyridine), at any suitable temperature (room temperature to elevated temperatures) preferably at elevated temperatures to form the desired $R_2$ compound.

The salts of the final acid compounds of this invention may be prepared by any of the well-knOwn methathesis procedures. For example, the benzoic acid compound may be reacted with an inorganic base, such as sodium hydroxide, potassium hydroxide, ammonium hydroxide, barium hydroxide, and the like. The anhydrides of this invention may be prepared by any of the well-known procedures in the art.

The preparation of these compounds containing the $R_1$ and $R_2$ groups other than hydrogen may be prepared in any order. The $R_1$ group could be placed on the molecule followed by addition of the $R_2$ substituent or by first obtaining the $R_2$ compound followed by addition of the $R_1$ group. The order of these reactions is not critical; they can be run in any desired fashion.

The following examples are used by way of illustration:

EXAMPLE 1

4-(4'Fluorophenyl)aniline
A solution of 3 grams 4'-fluoro-4-nitrobiphenyl in 125 ml. methanol is reduced by hydrogen at room temperature and 40 p.s.i. pressure using 100 mg. platinum oxide catalyst. After the required uptake of hydrogen, the mixture is filtered, 50 ml. 2.5 N hydrochloric acid added and the resulting solution is evaporated in vacuo. After washing the residue with ether, it is dissolved in methanol, filtered and diluted with excess ether. The precipitate which is 4-(4'-fluorophenyl)aniline hydrochloride is filtered washed with ether and dried in vacuo at room temperature.

EXAMPLE 2

2', 3', 4', 5', 6'-Pentafluoro-4-nitrobiphenyl
A mixture of 7.5 grams of pentafluoroaniline, 200 ml. of nitrobenzene, and 9.0 grams of iso-amyl nitrite, is warmed on the steam bath until a vigorous reaction with evolution of gas sets in. This evolution is allowed to proceed without heating until it has subsided, and the mixture is then heated on the steam bath for an additional 3 hours. The excess of nitrobenzene is removed in vacuo. The residue is purified for the desired isomer by elution from a silica gel column using petroleum-benzene to yield 2', 3', 4', 5', 6'-pentafluoro-4-nitrobiphenyl.

When 2-fluoroaniline is used in place of pentafluoroaniline in the above example, there is obtained 2'-fluoro-4-nitrobiphenyl.

When 2-nitrotoluene is used in place of nitrobenzene in the above example, there is obtained the corresponding 3-methyl biphenyls.

When 4-fluoroaniline and 2-methyl-nitrobenzene are used in the above example in place of pentafluoroaniline and nitrobenzene, there is obtained 4'-fluoro-3-methyl-4-nitrobiphenyl.

EXAMPLE 3

4-(pentafluorophenyl)aniline
A mixture of 5 grams of 2', 3', 4', 5', 6'-pentafluoro-4-nitrobiphenyl in 250 ml. of ethanol is reduced by hydrogen at atmospheric pressure and at room temperature using 5 percent palladium-on-charcoal (0.5 gram) catalyst. After the required uptake of hydrogen, the mixture is filtered and the catalyst washed with fresh ethanol. The ethanol solution is then concentrated in vacuo, and the residue recrystallized from aqueous ethanol to yield 4-(pentafluorophenyl)-aniline.

When 2'-fluoro-4-nitrobiphenyl is used in place of 2', 3', 4', 5', 6'-pentafluoro-4-nitrobiphenyl in the above examples, there is obtained 4-(4'-fluorophenyl)-aniline.

Similarly, when 4'-fluoro-3-methyl-4-nitrobiphenyl obtained from Example 2 is used in place of 2', 3', 4', 5', 6'-pentafluoro-4-nitrobiphenyl in the above example, there is obtained 2-methyl-4-(4'-fluorophenyl)-aniline.

EXAMPLE 4

4-(3'-Chloro-4'-fluorophenyl)-anisole
A mixture of 8.0 grams of 3-chloro-4-fluoroaniline, 200 ml. of anisole, and 9.0 grams of iso-amyl-nitrite, is warmed on a steam bath until a vigorous reaction with evolution of gas sets in. This evolution is allowed to proceed without heating until it has subsided, and the mixture is then heated on the steam bath for an additional 3 hours. The excess anisole is removed in vacuo, and the residue is chromatographed on a silica gel column using petroleum-benzene as eluent to yield 4-(3'-chloro-4'-fluorophenyl)-anisole.

When 2-chloro-4-fluoroaniline, 2,4-difluoroaniline and 3-fluoroaniline are used in place of 3-chloro-4-fluoroaniline in the above example, there are obtained the corresponding 4-(2'-chloro-4'-fluorophenyl)-anisole, 4-(2',4'-difluorophenyl)-anisole and 4-(3'-fluorophenyl)-anisole.

When 2-methylanisole is used in place of anisole in the above example, there is obtained the corresponding 2-methyl-4-(substituted phenyl)anisole.

EXAMPLE 5

4'-(3'-Chloro-4'-fluorophenyl)-phenol

To a solution of 2.1 grams of 4'-(3'-chloro-4'-fluorophenyl)-anisole in 50 ml. of boiling acetic acid is added 5 ml. of hydriodic acid and the boiling continued for 3 hours. Water is added and the reaction mixture cooled and the 4-(3'-chloro-4'-fluorophenyl)-phenol crystallizes. Further purification is then achieved by recrystallization of the solid from aqueous ethanol to yield 4-(3'-chloro-4'-fluorophenyl)-phenol.

When 4-(2'-chloro-4'-fluorophenyl)-anisole, 4-(2',4'-difluorophenyl)-anisole and 4-(3'-fluorophenyl)-anisole obtained from Example 4 are used in place of 4-(3'-chloro-4'-fluorophenyl)-anisole in the above example, there are obtained the corresponding 4-(2'-chloro-4'-fluorophenyl)-phenol, 4-(2',4'difluorophenyl)-phenol and 4-(3'-fluorophenyl)-phenol.

When the 2- or 3-alkylphenyl-anisole compounds obtained from Example 4 above are used in place of 4-(3'-chloro-4'-fluorophenyl)-anisole in the above example, there is obtained the corresponding 4-(substituted phenyl)-2-methyl phenol compound.

EXAMPLE 6

4-(4'-Fluorophenyl)-phenol

A solution of 32.66 grams of 4-(4'-fluorophenyl)-aniline in 120 ml. of glacial acetic acid is cooled to 10°–12° C. To this solution is added slowly a solution of 12.25 grams of sodium nitrite in 120 ml. of water with stirring and continued cooling. Five minutes after this addition, the suspension of the diazonium acetate is added slowly to a boiling solution of 100 ml. of concentrated sulfuric acid and 200 ml. of water. After the final addition of the diazonium salt, the suspension is boiled for an additional 5 minutes and then allowed to cool to room temperature. The reaction mixture is then filtered and the cake dried in vacuo to yield 4-(4'-fluorophenyl)phenol, (m.p. 152°–161° C., 24.07 grams).

When 4-(2'-fluorophenyl)-aniline, 4-(penta-fluorophenyl)-aniline obtained from Example 3 are used in place of 4-(4'-fluorophenyl)-aniline in the above example, there are obtained the corresponding 4-(2'-fluorophenyl)-phenol and 4-(pentafluorophenyl)-phenol.

When the methyl aniline compound obtained from Example 3 is used in place of 4-(4'-fluorophenyl)-aniline in the above example, there is obtained the corresponding 2-methyl phenol compound.

Similarly, when 2-methyl-4-(4'-fluorophenyl)-aniline obtained from Example 3 is used in place of 4-(4'-fluorophenyl)-aniline in the above example, there is obtained 2-methyl-4-(4'-fluorophenyl)-phenol.

EXAMPLE 7

2-Hydroxy-5-(4'-fluorophenyl)-benzoic acid

A mixture of 10 grams of 4-(4'-fluorophenyl)-phenol and 27.2 grams of potassium carbonate is exposed to carbon dioxide at 1,300 p.s.i. and 175° C. The dark mass obtained from this carbonation is then dissolved in 300 ml. of water and 200 ml. of methylene chloride and the two layers separated. The water layer is then extracted with 100 ml. of methylene chloride and then acidified with 2.5 N hydrochloric acid. This mixture is then filtered and the cake dried in vacuo to yield 5.32 grams of the crude product. The crude product is then recrystallized from benzene-methanol to yield 2.7 grams of material (m.p. 200°–204° C.). An additional crystallization of this semi-pure material from benzene-methanol yields analytically pure 2-hydroxy-5-(4'-fluorophenyl)-benzoic acid (m.p. 199°–203° C.).

When 4-(3'-chloro-4'-fluorophenyl)-phenol, 4-(2'-chloro-4'-fluorophenyl)-phenol, 4-(2',4'-difluorophenyl)-phenol and 4-(3'-fluorophenyl)-phenol obtained from Example 5 and 4'-(2'-fluorophenyl)-phenol and 4-(pentafluorophenyl)-phenol obtained from Example 6 are used in place of 4-(4'-fluorophenyl)-phenol in the above example, there are obtained the corresponding 2-hydroxy-5-(3'-chloro-4'-fluorophenyl)-benzoic acid, 2-hydroxy-5-(2'-chloro-4'-fluorophenyl)-benzoic acid, 2-hydroxy-5-(2',4'-difluorophenyl)-benzoic acid (m.p. 210°–211° C.), 2-hydroxy-5-(3'-fluorophenyl)-benzoic acid (m.p. 196°–197° C.), 2-hydroxy-5-(2'-fluorophenyl)-benzoic acid (m.p. 201°–203° C.) and 2-hydroxy-5-(pentafluorophenyl)-benzoic acid (m.p. 241°–243° C.).

When the 4-(substituted phenyl)-2-methyl phenol compounds of Examples 5 or 6 are used in place of 4-(4'-fluorophenyl)-phenol in the above, there are obtained 2-hydroxy-3-methyl-5-(3'-chloro-4'-fluorophenyl)-benzoic acid and 2-hydroxy-4-methyl-5-(2'-chloro-4'-fluorophenyl)-benzoic acid, respectively.

Similarly, when 2-methyl-4-(4'-fluorophenyl)-phenol obtained from Example 6 is used in place of 4-(4'-fluorophenyl)-phenol in the above example, there is obtained 2-hydroxy-4-(4'-fluorophenyl)-3-methyl-benzoic acid.

EXAMPLE 8

Sodium-2-hydroxy-5-(4'-fluorophenyl)-benzoate

A mixture of 0.1 mole of 2-hydroxy-5-(4'-fluorophenyl)-benzoic acid and 0.1 mole of sodium hydroxide in 100 ml. of water is stirred at room temperature for one-half hour. The reaction mixture is then concentrated in vacuo to yield sodium-2-hydroxy-5-(4'-fluorophenyl)-benzoate.

When the benzoic acid compounds obtained from Example 7 are used in place of the 2-hydroxy-5-(4'-fluorophenyl)-benzoic acid in the above example, there are obtained the corresponding sodium salts.

Similarly, when choline, glucosamine, S-methylmethionine, potassium hydroxide, ammonium hydroxide, barium hydroxide, calcium hydroxide, piperazine, chloroquine, hydroxychloroquine, dimethylaminoethanol, and magnesium hydroxide, are used in place of sodium hydroxide in the above example, there are obtained the corresponding choline, glucosamine, S-methyl-methionine, potassium, ammonium, barium, calcium, piperazine, chloroquine, hydroxychloro-quine, dimethylaminoethanol and magnesium salts, respectively.

EXAMPLE 9

A. Methyl-2-hydroxy-5-(4'-fluorophenyl)-benzoate

A solution of 5.0 grams of 2-hydroxy-5-(4'-fluorophenyl)-benzoic acid in 20 ml. of methanol and 2 ml. of concentrated sulfuric acid is heated at reflux for 5 hours. The mixture is then cooled and partitioned between (75:150 ml.) water and ethyl acetate and the organic layer washed with dilute sodium bicarbonate solution. The organic layer is then dried over magnesium sulfate and concentrated in vacuo to yield 5.3 grams (as an oil) of methyl-2-hydroxy-5-(4'-fluorophenyl)-benzoate.

When the benzoic acid compounds obtained from Example 7 are used in place of 2-hydroxy-5-(4'-fluorophenyl)-benzoic acid in the above example, there are obtained the corresponding methyl esters.

Similarly, when ethanol and n-butanol are used in place of methanol in the above example, there are obtained the corresponding ethyl and n-butyl esters.

B. Phenyl-2-hydroxy-5-(4'-fluorophenyl)-benzoate

A mixture of 6.4 grams of 2-hydroxy-5-(4'-fluorophenyl)benzoic acid, 2.8 grams of phenol and 1.7 grams of phosphorous oxychloride is heated at 114° C. until no more hydrogen chloride is evolved. The reaction mixture is cooled to room temperature and filtered. The resulting solid material is digested in dilute sodium carbonate solution, filtered, washed with water, dried and recrystallized from isopropyl alcohol to yield 4.0 grams of phenyl 2-hydroxy-5-(4'-fluorophenyl)benzoate, m.p. 80°–81° C.

Following the above procedure but using an equivalent amount of 2-acetoxy-5-(4'-fluorophenyl)benzoic acid in place of 2-hydroxy-5-(4'-fluorophenyl)benzoic acid, there is obtained phenyl 2-acetoxy-5-(4'-fluorophenyl) benzoate.

β-Diethylaminoethyl-2-hydroxy-5-(4'-fluorophenyl)-benzoate hydrochloride

A mixture of 4.0 grams (0.0175 mole) of 2-hydroxy-5-(4'-fluorophenyl)benzoic acid, 2.4 grams of potassium carbonate in 50 ml. of isopropanol is refluxed for ½ hr. 3.0 Grams (0.0175 m.) of β-diethylaminoethylchloride.Hcl. is added and the mixture refluxed with stirring for 15 hours. The reaction mixture is then distributed between water and ethyl ether. The ether layer is then washed with water, dried and evaporated to a small volume. Dry hydrogen chloride gas is then passed into the ether solution and the resulting precipitate is filtered and recrystallized from acetone/ethyl ether to yield β-diethylaminoethyl-2-hydroxy-5-(4'-fluorophenyl)-benzoate hydrochloride.

EXAMPLE 10

N,N-Dimethyl-2-hydroxy-5-(4'-fluorophenyl)-benzamide

A mixture of 5.3 grams of methyl-2-hydroxy-5-(4'-fluorophenyl)-benzoate and 20 ml. of dimethylamine is reacted in a bomb at 100° C. for 4 hours. After cooling, the bomb is opened and the excess dimethylamine removed. The residue is then recrystallized from benzene to yield N,N-dimethyl-2-hydroxy-5-(4'-fluorophenyl)-benzamide which has a melting point of 166°–168° C.

When the benzoic acid methyl esters obtained from Example 9 are used in place of methyl-2-hydroxy-5-(4'-fluorophenyl)-benzoate in the above example, there are obtained the corresponding N,N-dimethyl-benzamide compounds.

EXAMPLE 11

2-Acetoxy-5-(4'-fluorophenyl)-benzoic acid

A solution of 3.0 grams of 2-hydroxy-5-(4'-fluorophenyl)-benzoic acid in 12 ml. of pyridine and 8 ml. of acetic anhydride is heated on a steam bath for 20 minutes. The mixture is then poured onto ice and the product extracted with methylene chloride. The methylene chloride solution is dried and then evaporated. The residue is recrystallized from benzene to yield 2-acetoxy-5-(4'-fluorophenyl)-benzoic acid (m.p. 134°–137° C.).

When the 2-hydroxy-benzoic acid compounds obtained from Example 7 are used in place of 2-hydroxy-5-(4'-fluorophenyl)-benzoic acid in the above example, there are obtained the corresponding 2-acetoxy-benzoic acid compounds.

Similarly, when propionic acid anhydride is used in place of acetic anhydride, the corresponding 2-propionoxy compound is obtained.

EXAMPLE 12

Anhydride of 2-acetoxy-4-(4'-fluorophenyl)-benzoic acid

A solution of 0.01 mole of 2-acetoxy-4-(4'-fluorophenyl)-benzoic acid and 0.01 mole of thionyl chloride in 30 ml. of dry benzene is warmed until the formation of the substituted benzoyl chloride is complete. The resulting solution is concentrated to one-half volume in vacuo and is added to a solution of 0.01 mole of 2-acetoxy-4-(4'-fluorophenyl)-benzoic acid and 0.01 mole of pyridine in 30 ml. of benzene. The mixture is stirred at room temperature overnight, filtered, and the filtrate washed with cold dilute sodium bicarbonate solution. After drying and removal of benzene, the product is recrystallized from benzene-hexane.

Alternatively, the anhydride may be formed by reacting for 5 hours at room temperature 0.02 mole of 2-acetoxy-4-(4'-fluorophenyl)-benzoic acid and 0.01 mole of dicyclohexylcarbodiimide in 20 parts of tetrahydrofuran, followed by filtration and concentration of the filtrate to yield the anhydride.

When a solution of 2-acetoxy benzoic acid in pyridine is used in place of the 2-acetoxy-4-(4'-fluorophenyl)-benzoic acid pyridine solution in the above example, there is obtained the mixed anhydride of 2-acetoxy-4-(4'-fluorophenyl)-benzoic acid and 2-acetoxy benzoic acid.

EXAMPLE 13

5-(4'-Fluorophenyl)-2-hydroxy-3-methyl-benzoic acid

A. 4-(4'-Fluorophenyl)-2-hydroxymethyl-phenol

A solution of 5.0 g. of methyl-2-hydroxy-5-(4'-fluorophenyl)-benzoate in 25 ml. of ether is added to a stirred suspension of 1.28 g. of lithium aluminum hydride in 100 ml. of ether at a rate sufficient to maintain gentle reflux. Heating at reflux temperature is continued for 0.5 hour after the addition. The excess hydride is decomposed with ethyl acetate, and sufficient dilute hydrochloric acid is added to make separation of the ether layer possible. The ether phase is washed with water, dried over magnesium sulfate, and concentrated to dryness. Trituration with hexane yielded 3.93 g. of 4-(4'-fluorophenyl)-2-hydroxymethylphenol, m.p. 150°–157° C. Recrystallization from aqueous ethanol furnished pure material, m.p. 155°–157° C.

B. 4-(4'-Fluorophenyl)-2-acetoxymethylphenyl acetate

A mixture of 3.0 g. of 4-(4'-fluorophenyl)-2-hydroxymethyl-phenol, 10 ml. of acetic anhydride, and 6 ml. of pyridine is heated on the steam bath for 1 hour. The reaction mixture is poured into ice water, stirred for 0.5 hour, and the product extracted into ether. After drying with magnesium sulfate and treating with activated charcoal, 4-(4'-fluorophenyl)-acetoxymethylphenyl acetate is obtained as an oil. The yield is 3.95 g.

C. 4-(4'-Fluorophenyl)-2-methylphenyl acetate

A solution of 3.9 g. of 4-(4'-fluorophenyl)-2-acetoxymethylphenyl acetate in 30 ml. of glacial acetic acid is hydrogenated at 40 p.s.i. and 70° C. until the uptake of hydrogen is one equivalent. The catalyst and solvent are removed, the product is taken up in ether, washed with dilute sodium bicarbonate solution, dried, and the solution concentrated to dryness. The crude yield is 2.95 g. Chromatography of 2.6 g. of the crude product on 110 g. of silica gel furnishes 2.1 g. of pure 4'-(4'-fluorophenyl)-2-methylphenyl acetate, eluted with benzene, m.p. 71°–73° C.

D. 4-(4'-Fluorophenyl)-2-methyl-phenol

A mixture of 2.01 g. of 4-(4'-fluorophenyl)-2-methylphenyl acetate, 10 ml. of ethanol, and 10 ml. of 1.25 N sodium hydroxide is heated at reflux for 20 minutes. The reaction mixture is concentrated to dryness in vacuo, and the residue redissolved in water. After acidification and extraction of the product with ether, 1.6 g. of 4-(4'-fluorophenyl)-2-methyl-phenol is obtained, m.p. 130°–131° C.

E. 5-(4'-Fluorophenyl)-2-hydroxy-3-methyl-benzoic acid

A mixture of 1.5 g. of 4-(4'-fluorophenyl)-2-methyl-phenol and 6 g. of anhydrous potassium carbonate is heated in a bomb at 175° C. and 850 p.s.i. carbon dioxide pressure for 16 hours. The reaction mixture is suspended in hot water, acidified, and the cooled mixture extracted with ethyl acetate. The ethyl acetate was extracted repeatedly with portions of 1 percent solution of sodium bicarbonate. The pooled bicarbonate extracts are acidified, and the product extracted into ether. After treatment with magnesium sulfate and activated charcoal, the ether solution was concentrated to a small volume. The addition of hexane cause the crystallization of 0.71 g. of 5-(4'-fluorophenyl)-2-hydroxy-3-methyl-benzoic acid, m.p. 211°–213° C. (sublimes).

When the 3-unsubstituted ester compounds of Example 9 are used in place of methyl-2-hydroxy-5-(4'-fluorophenyl)-benzoate in the above example, there are obtained the corresponding 3-methyl benzoic acid compounds.

EXAMPLE 14

A dry filled capsule was prepared from the following components:

| | |
|---|---|
| 2-acetoxy-5-(4'-fluorophenyl)-benzoic acid | 300 mg. |
| corn starch | 150 mg. |
| Cab-o-sil | 5 mg. |
| Sterotex | 15 mg. |

A dry filled capsule can be prepared by using the following compounds as active ingredients instead of 2-acetoxy-5-(4'-fluorophenyl)-benzoic acid:

2-hydroxy-5-(4'-fluorophenyl)-benzoic acid;

2-acetoxy-5-(2',4'-difluorophenyl)-benzoic acid;
2-hydroxy-3-methyl-5-(4'-fluorophenyl)-benzoic acid;
phenyl-5-(4'-fluorophenyl)-2-hydroxy benzoate;
2-hydroxy-5-(3'-fluorophenyl)-benzoic acid;
or any other preferred compounds as shown in the specification.

If capsules of lower potency are to be made, the capsule size could be reduced or the quantity of corn starch could be increased.

EXAMPLE 15

Compressed tablets were prepared with the following components:

| | |
|---|---|
| 2-acetoxy-5-(4'-fluorophenyl)-benzoic acid | 300 mg. |
| cornstarch | 30 mg. |
| polyvinylpyrrolidone | 10 mg. |
| magnesium stearate | 3 mg. |

Tablets as above can be prepared by using the following compounds as active ingredients instead of 2-acetoxy-5-(4'-fluorophenyl)-benzoic acid:
2-hydroxy-5-(4'-fluorophenyl)-benzoic acid;
2-acetoxy-5-(2',4'-difluorophenyl)-benzoic acid;
2-hydroxy-3-methyl-5-(4'-fluorophenyl)-benzoic acid;
phenyl-5-(4'-fluorophenyl)-2-hydroxy benzoate;
2-hydroxy-5-(3'-fluorophenyl)-benzoic acid;
or any other especially preferred compound as shown in the specification.

Tablets of other potencies would be made by altering the tablet size as necessary.

What is claimed is:

1. A method of treating inflammation which comprises orally administering to a patient daily doses of from about 1 mg. to 140 mg./kg. body weight per day of a compound of the formula

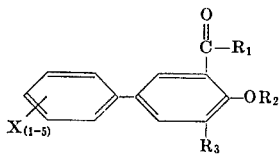

wherein X is halogen;
R$_1$ is hydroxy;
R$_2$ is hydrogen or lower alkanoyl;
R$_3$ is hydrogen or methyl; or a pharmaceutically non-toxic salt of the acid.

2. A method of claim 1 wherein the compound to be administered is 2-acetoxy-3-methyl-5-(4'-fluorophenyl) benzoic acid.

3. A method of treating inflammation which comprises orally administering to a patient daily doses of from about 2 mg. to 70 mg./kg. body weight per day of a compound of the formula:

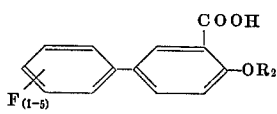

wherein R$_2$ is hydrogen or lower alkanoyl or a pharmaceutically non-toxic salt of the acid.

4. A method of claim 3 wherein the compound to be administered is 2-hydroxy-5-(pentafluorophenyl) benzoic acid.

5. A method of claim 3 wherein the compound to be administered is 2-hydroxy-5-(2'-fluorophenyl) benzoic acid.

6. A method of claim 3 wherein the compound to be administered is 2-hydroxy-5-(3'-fluorophenyl) benzoic acid.

7. A method of claim 3 wherein the compound to be administered is 2-hydroxy-5-(2',4'-difluorophenyl) benzoic acid.

8. A method of treating inflammation which comprises orally administering to a patient daily doses of from about 2 mg. to 70 mg./kg. body weight per day of a compound of the formula:

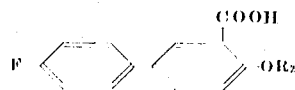

wherein R$_2$ is hydrogen or lower alkanoyl or a pharmaceutically non-toxic salt thereof.

9. A method of claim 8 wherein the compound to be administered is 2-hydroxy-5-(4'-fluorophenyl) benzoic acid.

10. A method of claim 8 wherein the compound to be administered is 2-acetoxy-5-(4'-fluorophenyl) benzoic acid.

11. A method of claim 8 wherein the compound to be administered is the choline salt of 2-hydroxy-5-(4'-fluorophenyl)benzoic acid.

12. A pharmaceutical anti-inflammatory composition consisting of an effective amount of at least one member selected from the group consisting of the compounds of the formula:

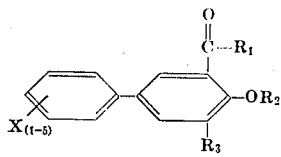

wherein X is halogen;
R$_1$ is hydroxy;
R$_2$ is hydrogen or lower alkanoyl;
R$_3$ is hydrogen or methyl; and a pharmaceutically non-toxic salt of the acid as an active ingredient, together with a pharmaceutically acceptable carrier.

13. A composition as in claim 12 wherein the active ingredient is 2-acetoxy-3-methyl-5-(4'-fluorophenyl)benzoic acid.

14. A pharmaceutical antiinflammatory composition consisting of an effective amount of at least one member selected from the group consisting of the compounds of the formula:

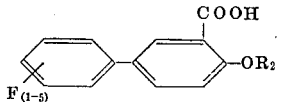

wherein R$_2$ is hydrogen or lower alkanoyl and a pharmaceutically non-toxic salt thereof as an active ingredient together with a pharmaceutically acceptable carrier.

15. A composition as in claim 14 wherein the active ingredient is 2-hydroxy-5-(pentafluorophenyl) benzoic acid.

16. A composition as in claim 14 wherein the active ingredient is 2-hydroxy-5-(2'-fluorophenyl) benzoic acid.

17. A composition as in claim 14 wherein the active ingredient is 2-hydroxy-5-(3'-fluorophenyl) benzoic acid.

18. A composition as in claim 14 wherein the active ingredient is 2-hydroxy-5-(2',4'-difluorophenyl) benzoic acid.

19. A pharmaceutical antiinflammatory composition consisting of an effective amount of at least one member selected from the group consisting of the compounds of the formula:

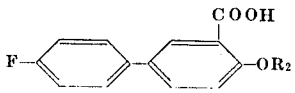

wherein R$_2$ is hydrogen or acetyl or a pharmaceutically non-toxic salt thereof, as an active ingredient, together with a pharmaceutically acceptable carrier.

20. A composition as in claim 19 wherein the active ingredient is 2-hydroxy-5-(4'-fluorophenyl) benzoic acid.

21. A composition as in claim 19 wherein the active ingredient is 2-acetoxy-5-(4'-fluorophenyl) benzoic acid.

22. A composition as in claim 19 wherein the active ingredient is the choline salt of 2-hydroxy-5-(4'-fluorophenyl)benzoic acid.

* * * * *